United States Patent
Wilensky et al.

(10) Patent No.: US 10,656,808 B2
(45) Date of Patent: May 19, 2020

(54) NATURAL LANGUAGE AND USER INTERFACE CONTROLS

(71) Applicant: Adobe Inc., San Jose, CA (US)

(72) Inventors: Gregg D. Wilensky, Pacific Palisades, CA (US); Walter W. Chang, San Jose, CA (US); Lubomira A. Dontcheva, San Francisco, CA (US); Gierad P. Laput, Canton, MI (US); Aseem O. Agarwala, Seattle, WA (US)

(73) Assignee: Adobe Inc., San Jose, CA (US)

( * ) Notice: Subject to any disclaimer, the term of this patent is extended or adjusted under 35 U.S.C. 154(b) by 17 days.

(21) Appl. No.: 13/683,341

(22) Filed: Nov. 21, 2012

(65) Prior Publication Data
US 2014/0082500 A1 Mar. 20, 2014

Related U.S. Application Data

(60) Provisional application No. 61/702,605, filed on Sep. 18, 2012.

(51) Int. Cl.
*G06F 3/0484* (2013.01)
*G06F 3/048* (2013.01)
*G06F 3/16* (2006.01)

(52) U.S. Cl.
CPC .......... *G06F 3/04845* (2013.01); *G06F 3/048* (2013.01); *G06F 3/0484* (2013.01);
(Continued)

(58) Field of Classification Search
CPC .......... G06F 3/16; G06F 3/0481; G06F 3/167; G06F 3/0482; G06F 3/04842; G06F 17/2765; G06F 17/30386; G06F 17/30705; G06F 3/04845; G06F 3/048; G06F 3/0484; G06F 3/0167; G06F 3/0488; G06F 3/0487; G06F 3/04883; G06F 1/1652; G06F 2203/04102; G06F 2203/0381; G11B 27/34; G10L 21/10; G10L 15/00; G10L 15/02; G10L 15/08; G10L 15/005; G10L 15/20; H04N 21/454; H04M 1/0241; H04M 1/026; H04M 1/72563; H04M 1/72552; H04M 1/72577; H04M 1/0202;
(Continued)

(56) References Cited

U.S. PATENT DOCUMENTS

| | | |
|---|---|---|
| 4,726,065 A | 2/1988 | Froessl |
| 5,526,020 A | 6/1996 | Campanelli et al. |

(Continued)

OTHER PUBLICATIONS

"Non-Final Office Action", U.S. Appl. No. 13/683,466, dated May 9, 2014, 21 pages.
(Continued)

*Primary Examiner* — Nicholas Klicos
(74) *Attorney, Agent, or Firm* — SMBC

(57) ABSTRACT

Natural language and user interface control techniques are described. In one or more implementations, a natural language input is received that is indicative of an operation to be performed by one or more modules of a computing device. Responsive to determining that the operation is associated with a degree to which the operation is performable, a user interface control is output that is manipulable by a user to control the degree to which the operation is to be performed.

20 Claims, 9 Drawing Sheets

(52) U.S. Cl.
CPC .......... *G06F 3/04842* (2013.01); *G06F 3/167* (2013.01); *G06F 2203/0381* (2013.01)

(58) Field of Classification Search
CPC .......... H04M 1/72569; H04M 1/72572; H04L 51/28; G06Q 10/10; G06N 99/005; G06N 99/00; G01C 21/00; G01C 21/34; G01C 21/36; H04W 4/02
USPC ........................................................ 715/727
See application file for complete search history.

(56) References Cited

U.S. PATENT DOCUMENTS

| | | | |
|---|---|---|---|
| 5,684,999 A * | 11/1997 | Okamoto | G06F 17/30265 382/305 |
| 6,133,904 A * | 10/2000 | Tzirkel-Hancock | G10L 15/26 345/156 |
| 6,243,713 B1 | 6/2001 | Nelson et al. | |
| 6,278,967 B1 | 8/2001 | Akers et al. | |
| 6,690,825 B1 * | 2/2004 | Nakayama | G06K 9/2054 348/169 |
| 6,970,185 B2 | 11/2005 | Halverson | |
| 7,493,253 B1 | 2/2009 | Ceusters et al. | |
| 7,539,619 B1 | 5/2009 | Seligman et al. | |
| 7,593,603 B1 | 9/2009 | Wilensky | |
| 7,739,597 B2 | 6/2010 | Wong et al. | |
| 7,844,458 B2 * | 11/2010 | Hirota et al. | 704/252 |
| 7,912,702 B2 | 3/2011 | Bennett | |
| 7,978,938 B1 | 7/2011 | Wilensky | |
| 7,986,298 B1 * | 7/2011 | Dulaney | G06T 11/60 345/156 |
| 8,117,023 B2 | 2/2012 | Funakoshi et al. | |
| 8,150,107 B2 | 4/2012 | Kurzweil et al. | |
| 8,218,026 B2 | 7/2012 | Oishi | |
| 8,265,925 B2 | 9/2012 | Aarskog | |
| 8,374,871 B2 | 2/2013 | Ehsani et al. | |
| 8,380,718 B2 | 2/2013 | Gallivan et al. | |
| 8,442,812 B2 | 5/2013 | Ehsani et al. | |
| 8,589,396 B2 | 11/2013 | Achtermann et al. | |
| 8,619,147 B2 | 12/2013 | Martin et al. | |
| 8,630,975 B1 | 1/2014 | Guo et al. | |
| 9,141,335 B2 | 9/2015 | Wilensky et al. | |
| 9,412,366 B2 | 8/2016 | Wilensky et al. | |
| 9,436,382 B2 | 9/2016 | Wilensky et al. | |
| 9,588,964 B2 | 3/2017 | Chang et al. | |
| 9,928,836 B2 | 3/2018 | Wilensky et al. | |
| 2002/0069070 A1 | 6/2002 | Boys et al. | |
| 2003/0093419 A1 | 5/2003 | Bangalore et al. | |
| 2003/0204814 A1 | 10/2003 | Elo et al. | |
| 2004/0181390 A1 | 9/2004 | Manson | |
| 2005/0080611 A1 | 4/2005 | Huang et al. | |
| 2005/0132420 A1 * | 6/2005 | Howard | G06F 3/017 725/135 |
| 2006/0047617 A1 | 3/2006 | Bacioiu et al. | |
| 2006/0155693 A1 | 7/2006 | Chowdhury et al. | |
| 2007/0057930 A1 | 3/2007 | Iwema et al. | |
| 2007/0179777 A1 | 8/2007 | Gupta et al. | |
| 2007/0225969 A1 | 9/2007 | Coffman et al. | |
| 2007/0238520 A1 | 10/2007 | Kacmarcik | |
| 2008/0003547 A1 * | 1/2008 | Woolfe et al. | 434/98 |
| 2008/0007749 A1 * | 1/2008 | Woolfe | 358/1.9 |
| 2008/0068456 A1 * | 3/2008 | Fujii | G06F 17/3025 348/130 |
| 2008/0252595 A1 * | 10/2008 | Boillot | G06F 3/011 345/156 |
| 2009/0256947 A1 * | 10/2009 | Ciurea et al. | 348/333.12 |
| 2010/0121636 A1 | 5/2010 | Burke et al. | |
| 2010/0191773 A1 | 7/2010 | Stefik et al. | |
| 2010/0280829 A1 | 11/2010 | Gopi et al. | |
| 2010/0281366 A1 * | 11/2010 | Langmacher | G06F 3/04845 715/716 |
| 2010/0318348 A1 | 12/2010 | Chelba et al. | |
| 2011/0007078 A1 | 1/2011 | Cao et al. | |
| 2011/0032373 A1 * | 2/2011 | Forutanpour | G11B 27/034 348/222.1 |
| 2011/0082710 A1 * | 4/2011 | Subash et al. | 705/3 |
| 2011/0090246 A1 * | 4/2011 | Matsunaga | G06F 3/04883 345/620 |
| 2011/0099157 A1 | 4/2011 | LeBeau et al. | |
| 2011/0106534 A1 | 5/2011 | Lebeau et al. | |
| 2011/0150321 A1 * | 6/2011 | Cheong | G06T 11/60 382/154 |
| 2011/0167064 A1 | 7/2011 | Achtermann et al. | |
| 2011/0182477 A1 * | 7/2011 | Tamrakar | G06T 7/0002 382/110 |
| 2011/0208524 A1 | 8/2011 | Haughay | |
| 2011/0246204 A1 | 10/2011 | Chen et al. | |
| 2011/0273369 A1 * | 11/2011 | Imai | G06T 15/50 345/158 |
| 2011/0304729 A1 * | 12/2011 | Arcaini | G06K 9/00771 348/143 |
| 2012/0001934 A1 * | 1/2012 | Bala | G06T 11/001 345/594 |
| 2012/0022876 A1 | 1/2012 | Lebeau et al. | |
| 2012/0032968 A1 * | 2/2012 | Fan | G06F 17/20 345/589 |
| 2012/0035932 A1 * | 2/2012 | Jitkoff et al. | 704/254 |
| 2012/0042022 A1 | 2/2012 | Sheth et al. | |
| 2012/0051658 A1 * | 3/2012 | Tong | G11B 27/034 382/224 |
| 2012/0112995 A1 * | 5/2012 | Maeda | G06F 3/017 345/156 |
| 2012/0151326 A1 * | 6/2012 | Cross et al. | 715/234 |
| 2012/0166180 A1 | 6/2012 | Au | |
| 2012/0191460 A1 | 7/2012 | Ng-Thow-Hing et al. | |
| 2012/0232976 A1 * | 9/2012 | Calman | G06Q 30/02 705/14.25 |
| 2012/0280915 A1 * | 11/2012 | Kyllonen | G06F 3/0488 345/173 |
| 2012/0299942 A1 * | 11/2012 | Braun | G06T 11/001 345/589 |
| 2012/0301023 A1 * | 11/2012 | Braun | G06T 5/009 382/167 |
| 2013/0027421 A1 * | 1/2013 | Bala | G09G 5/02 345/594 |
| 2013/0041479 A1 * | 2/2013 | Zhang | G05B 19/056 700/17 |
| 2013/0086105 A1 * | 4/2013 | Hammontree | G06F 17/30864 707/769 |
| 2013/0104054 A1 * | 4/2013 | Cao | G06F 3/038 715/753 |
| 2013/0152007 A1 * | 6/2013 | Costenaro | G06F 3/0481 715/779 |
| 2013/0283185 A1 * | 10/2013 | Mock | 715/746 |
| 2013/0322716 A1 * | 12/2013 | Wollenweber | G06T 7/0083 382/131 |
| 2014/0078075 A1 | 3/2014 | Wilensky | |
| 2014/0078076 A1 | 3/2014 | Wilensky | |
| 2014/0081625 A1 | 3/2014 | Wilensky | |
| 2014/0081626 A1 | 3/2014 | Chang | |
| 2014/0082003 A1 | 3/2014 | Feldman | |
| 2014/0185862 A1 | 7/2014 | Kamath | |
| 2014/0250120 A1 * | 9/2014 | Mei | G06F 3/0488 707/736 |
| 2015/0199320 A1 * | 7/2015 | Ho | G06F 3/017 715/233 |
| 2015/0294451 A1 * | 10/2015 | Lee | F25D 29/00 382/110 |
| 2016/0321242 A1 | 11/2016 | Wilensky et al. | |

OTHER PUBLICATIONS

"Non-Final Office Action", U.S. Appl. No. 13/683,278, dated Jun. 20, 2014, 10 pages.

"Final Office Action", U.S. Appl. No. 13/683,466, dated Aug. 21, 2014, 25 pages.

"Non-Final Office Action", U.S. Appl. No. 13/683,416, dated Mar. 18, 2015, 14 pages.

(56) References Cited

OTHER PUBLICATIONS

"Notice of Allowance", U.S. Appl. No. 13/683,466, dated May 8, 2015, 6 pages.
"Non-Final Office Action", U.S. Appl. No. 13/683,278, dated Feb. 13, 2015, 12 pages.
"Non-Final Office Action", U.S. Appl. No. 13/683,509, dated Feb. 20, 2015, 18 pages.
"Non-Final Office Action", U.S. Appl. No. 13/683,466, dated Dec. 1, 2014, 29 pages.
"Corrected Notice of Allowance", U.S. Appl. No. 13/683,466, dated Aug. 26, 2015, 4 pages.
"Final Office Action", U.S. Appl. No. 13/683,278, dated Aug. 20, 2015, 19 pages.
"Final Office Action", U.S. Appl. No. 13/683,416, dated Aug. 5, 2015, 15 pages.
"Non-Final Office Action", U.S. Appl. No. 13/683,509, dated Jul. 8, 2015, 20 pages.
"Non-Final Office Action", U.S. Appl. No. 13/683,278, dated Jan. 5, 2016, 11 pages.
"Non-Final Office Action", U.S. Appl. No. 13/683,416, dated Nov. 23, 2015, 15 pages.
"Non-Final Office Action", U.S. Appl. No. 13/683,509, dated Jun. 22, 2016, 14 pages.
"Notice of Allowance", U.S. Appl. No. 13/683,278, dated May 27, 2016, 5 pages.
"Notice of Allowance", U.S. Appl. No. 13/683,416, dated Mar. 29, 2016, 11 pages.
"Notice of Allowance", U.S. Appl. No. 13/683,509, dated Oct. 25, 2016, 11 pages.
"Supplemental Notice of Allowance", U.S. Appl. No. 13/683,509, dated Nov. 4, 2016, 8 pages.
"Supplemental Notice of Allowance", U.S. Appl. No. 13/683,509, dated Feb. 6, 2017, 8 pages.
"Non-Final Office Action", U.S. Appl. No. 15/209,676, dated Jun. 22, 2017, 14 pages.
"Notice of Allowance", U.S. Appl. No. 15/209,676, dated Nov. 8, 2017, 11 pages.

* cited by examiner

800

802
Display a user interface control that is indicative of a degree to which an image editing operation is performed on at least a portion of an image, the display performed responsive to receipt of a natural language input that specifies the image editing operation and performed simultaneously with the portion of the image to which the image editing operation is performed 804
Adjust the degree to which the image editing operation is performed responsive to one or more inputs that are received via interaction with the user interface control 806
Display a result of the adjustment on at least the portion of the image simultaneously with a display of the user interface control that is indicative of the adjusted degree 808
Cease output of the user interface control after a threshold amount of time has passed during which interaction with the user interface control has not occurred

Fig. 8

NATURAL LANGUAGE AND USER INTERFACE CONTROLS

CROSS REFERENCE

This application claims priority under 35 U.S.C. Section 119(e) to U.S. Provisional Patent Application No. 61/702,605, filed Sep. 18, 2012, and titled "Natural Language and User Interface Controls," the disclosure of which is hereby incorporated by reference in its entirety.

BACKGROUND

The functionality made available via operations of image editing and other applications is ever increasing. For example, users may enhance, crop, composite, matte, and alter image data using a multitude of different operations.

However, the sheer number of choices of operations that are made available may make it difficult for a user to locate a particular operation of interest. This may include making the user aware of the operation and even locating functionality to initiate to operation once aware. Consequently, users may choose to forgo this functionality, which may hinder a user's experience with the applications.

SUMMARY

Natural language and user interface control techniques are described. In one or more implementations, a natural language input is received that is indicative of an operation to be performed by one or more modules of a computing device. Responsive to determining that the operation is associated with a degree to which the operation is performable, a user interface control is output that is manipulable by a user to control the degree to which the operation is to be performed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 8 depicts a procedure in an example implementation in which interaction with a user interface control to set a degree to which an operation is to be performed is described.

DETAILED DESCRIPTION

Overview

Interaction with applications may be complex. The inclusion of a multitude of operations, for instance, may make it difficult for a user to discover a particular one of the operations of the application. Even when the operations are discovered and understood, initiation of a desired operation may involve multiple steps. These steps may be complex and often involve skills developed by professionals and as such may even tax the skills of the professionals. Additionally, although other operations may be simpler to locate and initiate, these operations may involve multiple manual steps and therefore be considered tedious by a user. Consequently, novice and even professional users of conventional applications may become frustrated with conventional techniques that are used to interact with the applications.

Natural language techniques are described. In one or more implementations, a natural language processing module may be employed to determine a likely intent of a user that provided a natural language input. This intent may be used to identify an operation that is to be performed through execution of an application, such as an image editing operation.

Further these techniques may leverage a user interface control to aid a user's interaction with the application. For example, a natural language input may involve operations that involve various degrees of performance, such as an amount of contrast, a size of a portion of an image, and so on. Through interaction with a user interface control, however, a user may specify and adjust this degree of performance. In this way, the user interface control may be used to aid a user's interaction in setting this degree such that a user may readily view and make adjustments to a degree to which the operation is to be performed. Further discussion of the use of user interface controls and natural language inputs may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
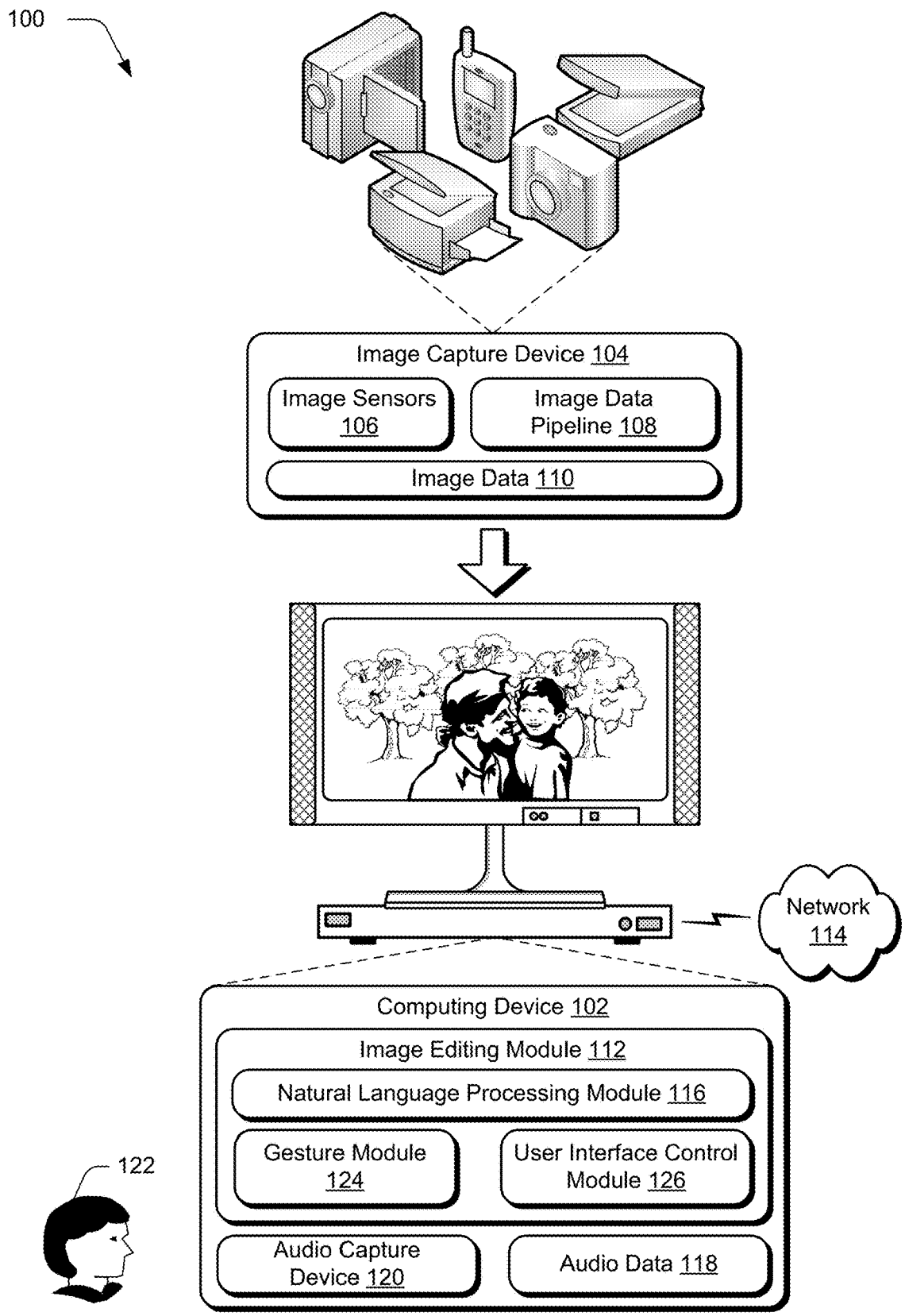
FIG. 1 is an illustration of an environment in an example implementation that is operable to employ techniques described herein relating to natural language user interface controls.

FIG. 1 is an illustration of an environment 100 in an example implementation that is operable to employ techniques described herein. The illustrated environment 100 includes a computing device 102 and an image capture device 104, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 9.

The image capture device 104 may also be configured in a variety of ways. Illustrated examples of such configurations include a video camera, scanner, copier, camera, mobile device (e.g., smart phone), and so forth. Although the image capture device 104 is illustrated separately from the computing device 102, the image capture device 104 may be configured as part of the computing device, e.g., for a tablet configuration, smart phone as illustrated, and so forth.

The image capture device 104 is illustrated as including image sensors 106 and an image data pipeline 108 that are each configured to form image data 110. For example, the image sensors 106 may be configured to capture images using a Bayer pattern or other configurations. Therefore, in this instance, the image data 110 generated by the image sensors 106 may be considered to be in a raw image format.

The image data 110 may also be processed by an image data pipeline 108 using a variety of different operations. These operations may include operations in which the image data 110 is considered to remain in a substantially raw image format. Examples of these operations include interpolation of the image data in the raw format (e.g., a Bayer pattern) into a red, green, and blue image format, de-mosaicking, and linear processing operations. The image data pipeline 108 may also perform operations in which the image data 110 is not in a raw or substantially raw image format, such as to perform gamma correction, sharpening, de-noising, or other non-linear operations. Thus, the image data 110 may be configured according to a variety of different image formats.

Further, the image data 110 is not limited to capture by an image capture device 104. The image data 110, for instance, may be generated through interaction of a user with a user interface, automatically through execution of an application, and so on. Thus, the image data 110 may also originate from a variety of different sources.

Regardless of how the image data 110 is originated, the image data 110 may then be obtained by an image editing module 112. As before, although the image editing module 112 is illustrated as being implemented on a separate device it should be readily apparent that other implementations are also contemplated in which the image sensors 106 and image editing module 112 are implemented on the same device. Further, although illustrated as being provided by a computing device 102 in a desktop configuration, a variety of other configurations are also contemplated, such as a tablet, remotely over a network 114 as part of a web platform as further described in relation to FIG. 9, and so on.

The image editing module 112 is representative of functionality that is configured to process the image data 110 using one or more operations. Examples of such functionality in FIG. 1 include operations to edit the image data 110, such as to change a display characteristic of one or more pixels described by the image data 110, decompose the image data 110, composite the image data 110 (e.g., with other image data to form a new image), and so forth. However, as previously described the sheer multitude of operations that may be made available may make it difficult to interact with the image editing module 112.

Accordingly, the image editing module 112 is illustrated as including a natural language processing module 116. The natural language processing module 116 is representative of functionality to process a natural language input, such as text, audio data 118, and so on. For example, the audio data 118 may be captured by an audio capture device 120 from a user 122. Other examples are also contemplated, such as audio data received via the network 114 (e.g., through configuration of the computing device 102 as part of a web service), and so on. The natural language processing module 116, for instance, may be configured to process audio data 118 to initiate one or more operations of the image editing module 112.

The image editing module 112 is also illustrated as including a gesture module 124. The gesture module 124 is representative of functionality to recognize gestures detected via touch functionality by the computing device 102. Touch functionality may be implemented using a variety of touch sensors, including capacitive sensors, resistive sensors, image sensors, strain gauges, and so on. The computing device 102, for instance, may include a display device having touchscreen functionality, track pad, camera, and so on. These devices may be used to detect proximity of an object and recognize initiation of an operation based on this proximity, movement of the object, and so on.

The image editing module 112 is further illustrated as including a user interface control module 126. The user interface control module 126 is representative of functionality to locate and manage output of user interface controls for interaction with the image editing module 112. User interface controls, for instance, may be used to specify and adjust a degree to which an operation such as an image editing operation is to be performed.

Through use of these modules, operations of the image editing module 112 may be implemented in a variety of ways, further description of which may be found in the following discussion and associated figure. Although the natural language processing module 116, gesture module 124, and user interface control module 126 are illustrated as part of the image editing module 112, it should be readily apparent that this functionality may be implemented separately (e.g., as individual applications, plug in modules, as part of an operating system), further combined with other functionality, implemented as part of other applications to initiate functions thereof, and so on.

Figure 2:
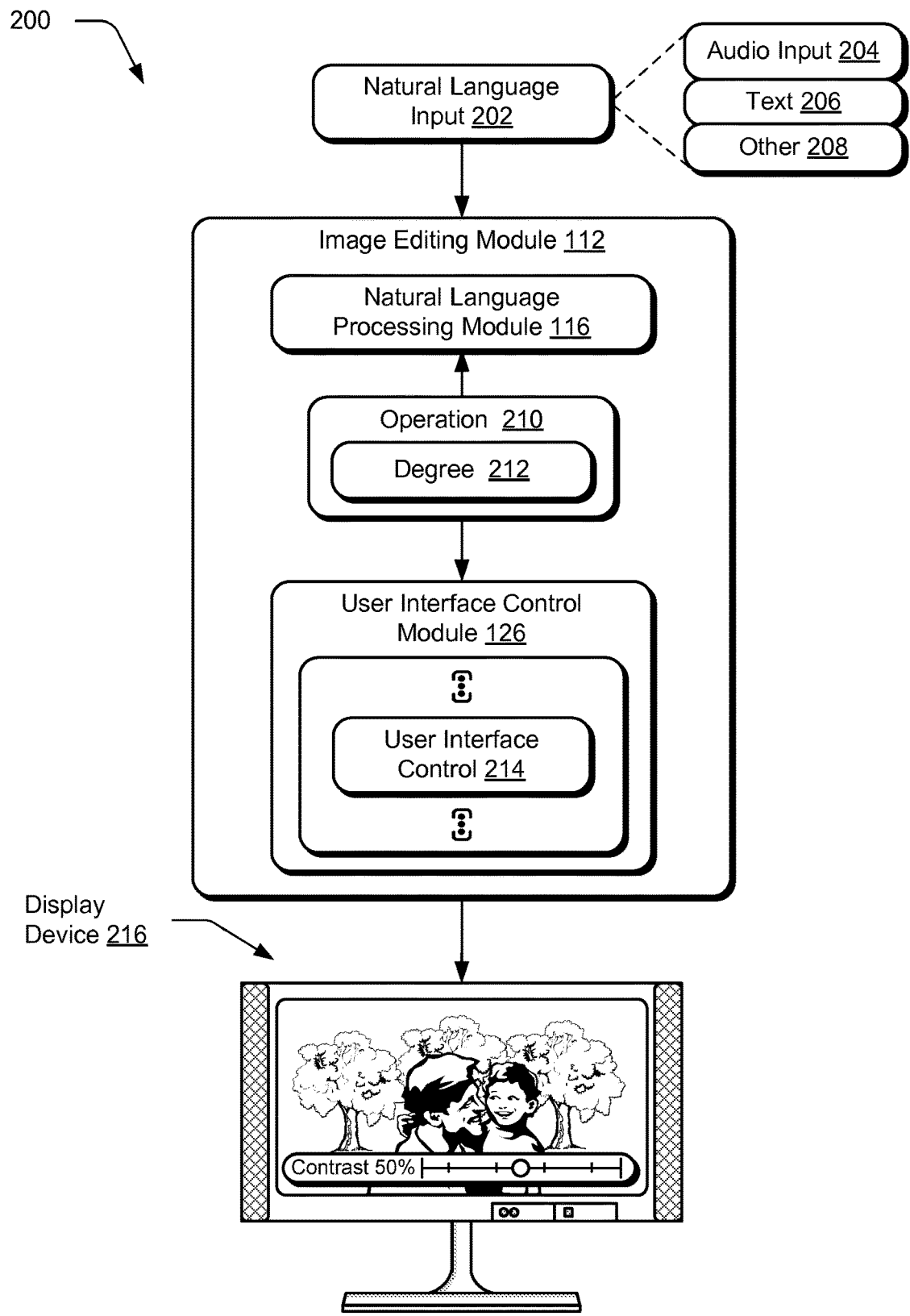
FIG. 2 depicts a system in an example implementation in which an example of operation of a natural language processing module, gesture module, and user interface control module of an image editing module is shown.

FIG. 2 depicts a system 200 in an example implementation in which an example of operation of the natural language processing module 116, gesture module 124, and user interface control module 126 of the image editing module 112 is shown. A natural language input 202 is illustrated as being received by an image editing module 112. The natural language input 202 may originate from a variety of different sources, such as an audio input 204 that is converted to text using a speech-to-text engine, text 206 that is manually entered by a user, or other 208 sources.

Regardless of the source, the natural language input 202 may be received by a natural language processing module 116. The natural language processing module 116 is representative of functionality to process the natural language input 202 to identify an operation 210, such as an image editing operation performable by the image editing module 112 to edit an image. This may include use of semantic distances and lexicon ontologies to identify which operation likely corresponds to text from the input, such as to support mapping of a general vocabulary to a constrained vocabulary of operations.

The natural language processing module 116 may also process the natural language input 202 to identify text that is indicative of a degree 212 to which the operation 210 is to be performed. For example, the operation 210 may be configured to be performed using a variety of different values, such as to set an amount of contrast, brightness, and so on. The degree 212 may also define an amount of data that is to be processed, such as by specifying a portion of an image that it to be subject of the operation. A variety of other examples are also contemplated, such as to pass an operation 210 to a user interface control module 126, which then further processes an input to determine if the operation is associated with a degree of performance.

The user interface control module 126 may then find one or more user interface controls 214 to be output, such as displayed on a display device 216 of the computing device 102. The user interface controls 214 may be configured to be used in conjunction with the operation 210 to set and display the degree 212 to which the operation 210 is performed. The one or more user interface controls 214 may also be used to readjust the degree 212 that the operation 210 is performed. In this way, a user may initially specify a degree 212 to which the operation 210 is performed using a natural language input 202 and then adjust the degree through interaction with the user interface control 214, an example of which is described in the following discussion and corresponding figure.

Figure 3:
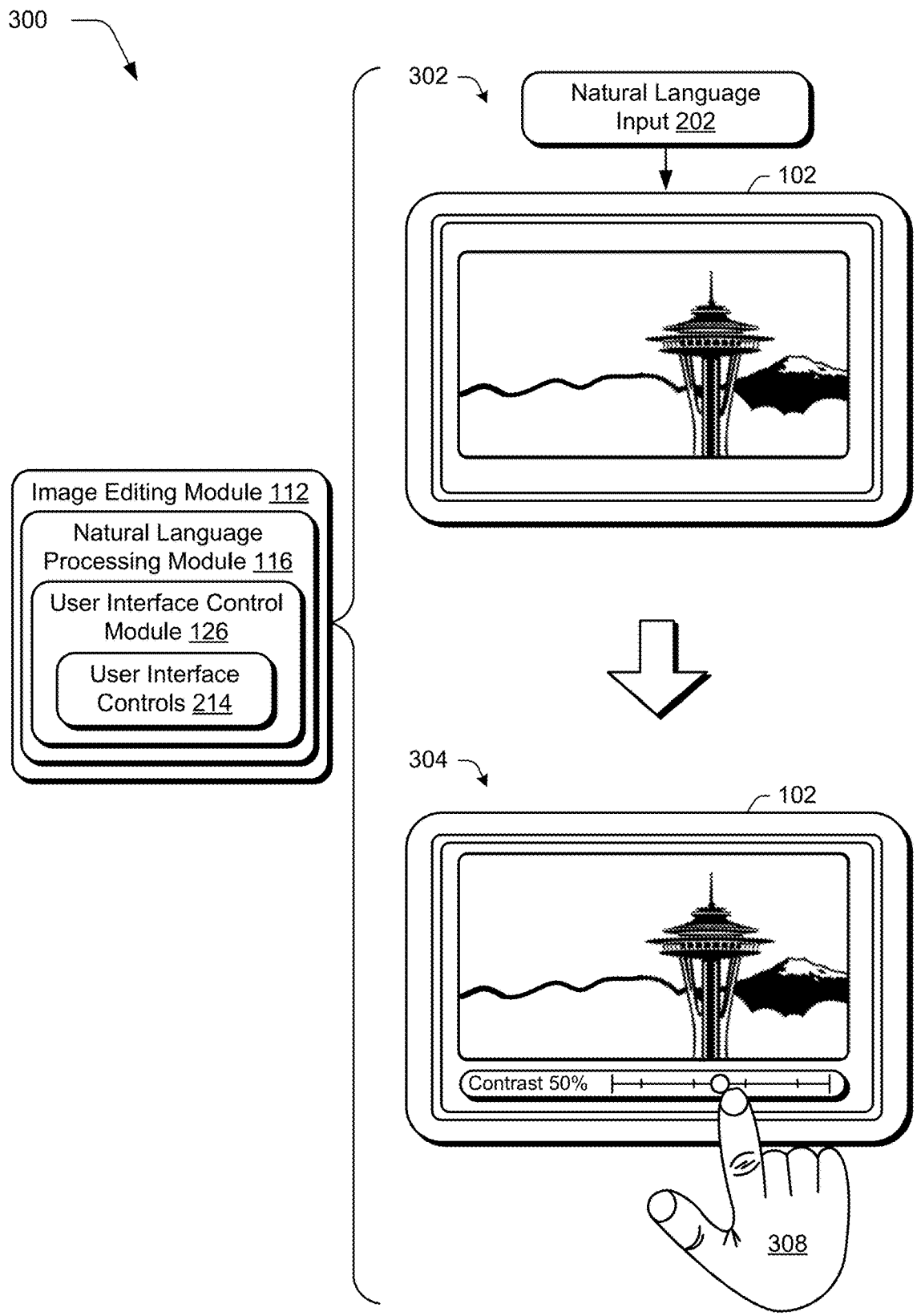
FIG. 3 depicts an example system showing output of a user interface control responsive to a natural language input.

FIG. 3 depicts an example system 300 showing output of a user interface control 214 responsive to a natural language input 202. Operation of the system 300 of FIG. 3 is illustrated through the user of first and second stages 302, 304. At the first stage 302, a natural language input 202 is received by a natural language processing module 116 of the computing device 102.

The natural language processing module 116 may then process the natural language input 202 to identify one or more operations that are specified by the natural language input 202. The natural language processing module 116, in conjunction with the user interface control module 126, may also determine that the identified operations are associated with a degree to which the operations may be performed.

The natural language input 202, for instance, may include the text "improve the image's contrast a bit." Thus, the natural language processing module 116 may determine that the natural language input involves a "contrast" operation. In response, a determination may also be made that the contrast operation is associated with a degree to which the operation may be performed. Accordingly, the user interface control module 126 may locate a user interface control 214 that is configured to adjust the degree to which the contrast operation is performed, which may then be output as shown in the second stage 304.

The user interface control 214 in the second stage 304 is configured as a slider control. The slider control includes an indication that specifies the degree to which the contrast operation is currently set, which is illustrated as a circle in FIG. 3. The slider control also includes a plurality of additional indications that specify other degrees to which the slider control may be set, which are illustrated as hash marks. In this way, a user may adjust the operation (e.g., the contrast in the current example) through interaction with the slider control, such as through use of a gesture performed by a finger of a user's hand 308, a natural language input (e.g., speech to adjust "up" or "down"), and so on.

Continuing with the previous example, the natural language input "improve the image's contrast a bit" was received and used to identify an operation. The natural language input also identifies a degree to which the operation is to be performed, e.g., "improve . . . a bit." Therefore, the natural language processing module 116 may map this input to adjust the performance of the operation and the user interface control 214 may indicate the degree to which the operation is performed. However, different users may have different expectations regarding what "improve . . . a bit" means. Therefore, the user interface control 214 may be used to readjust the performance of the operation as desired. Further, this readjustment may be performed in real time simultaneously with a display of an output of a result of the readjust of the operation to support an intuitive user experience.

In the previous example, the natural language input 202 specified both the operation and a degree to which the operation is to be performed. In another example, the natural language input 202 may specify the operation but be silent regarding the degree. In such an instance, the natural language processing module 116 and user interface control module 126 may leverage a default degree of performance for the operation. For the contrast operation, for instance, the default may indicate that contrast is to adjusted by a default amount, a default amount of contrast improvement is to be performed in responsive to identification of a default operation, and so on.

As before, the user interface control 214 may then be used to display the degree to which the operation is performed and permit a user to readjust the degree. Thus, even in this example the efficiency with which a user may interact may be improved in an intuitive manner. Although a slider control was described in this example, other configurations of user interface controls are also contemplated, such as a radial dial. Further, although the degree involved an overall level of performance from a plurality of different levels, the degree may also be used to specify a portion to which the operation is to be performed, further discussion of which may be found in the following description and corresponding drawing figure.

Figure 4:
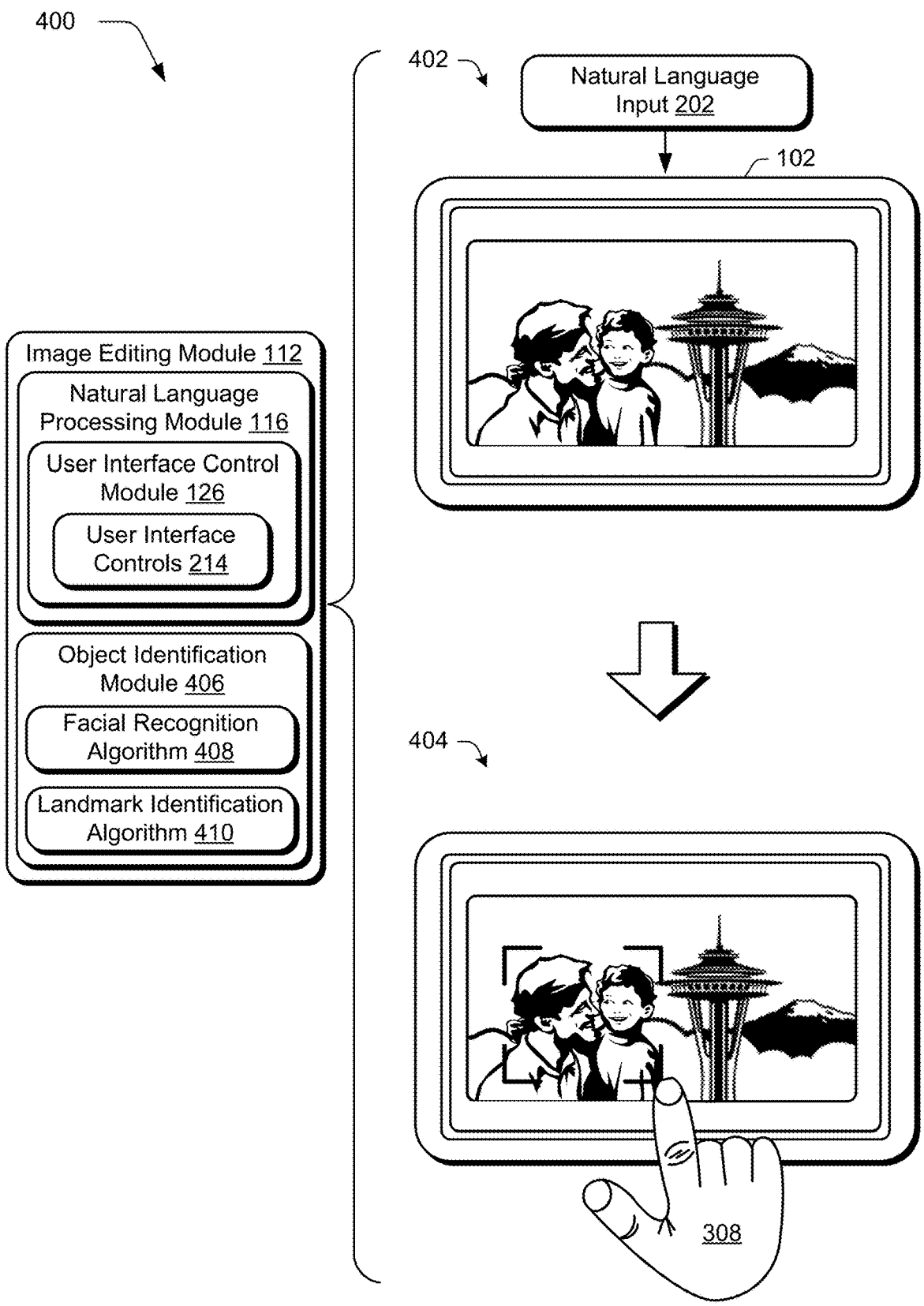
FIG. 4 depicts an example of a system showing output of a user interface control responsive to a natural language input that is configured to specify a portion of an image to which an operation is to be performed.

FIG. 4 depicts an example of a system 400 showing output of a user interface control 214 responsive to a natural language input 202 that is configured to specify a portion of an image to which an operation is to be performed. This system 400 is also illustrated using first and second stages 402, 404 to illustrate output of a user interface control. In this example, the natural language input 202 is processed by the natural language processing module 116 to identify text that describes an operation, such as "extract the people from the image."

Thus, the natural language processing module 116 may identify the operation "extract" as before and in conjunction with the user interface control module 126 identify that the operation is associated with a degree of performance, i.e., a part of an image that includes the people. Accordingly, an object identification module 406 may be employed to identify which portions of the image are likely to include people. This may include use of a facial recognition algorithm 408 to identify faces and associated body parts of people. Other objects may also be identified, such as to utilize a landmark identification algorithm 410 to identify a landmark, e.g., the Space Needle, in the image.

The user interface control module 126 may also be leveraged to aid a user in selecting a desired portion of the image to which the operation is to be performed. As shown in the second stage 404, for instance, a user interface control 214 is illustrated as a bounding box that is disposed around a border of the image that has been identified by the object identification module 406 as including "people." The bounding box may be configured for adjustment by a user, such as via one or more fingers of a user's hand, a cursor control device, another natural language input (e.g., "make the box smaller/bigger"), and so forth.

Thus, user interface controls 214 may be leveraged to adjust the degree of performance for both values (e.g., permissible levels of performance along a scale) and portion (e.g., coordinates) for an operation. The natural language input 202 may also be leveraged in conjunction with other functionality of the computing device 102 to support an efficient and intuitive user experience, an example of which is described below and shown in conjunction with an associated figure.

Figure 5:
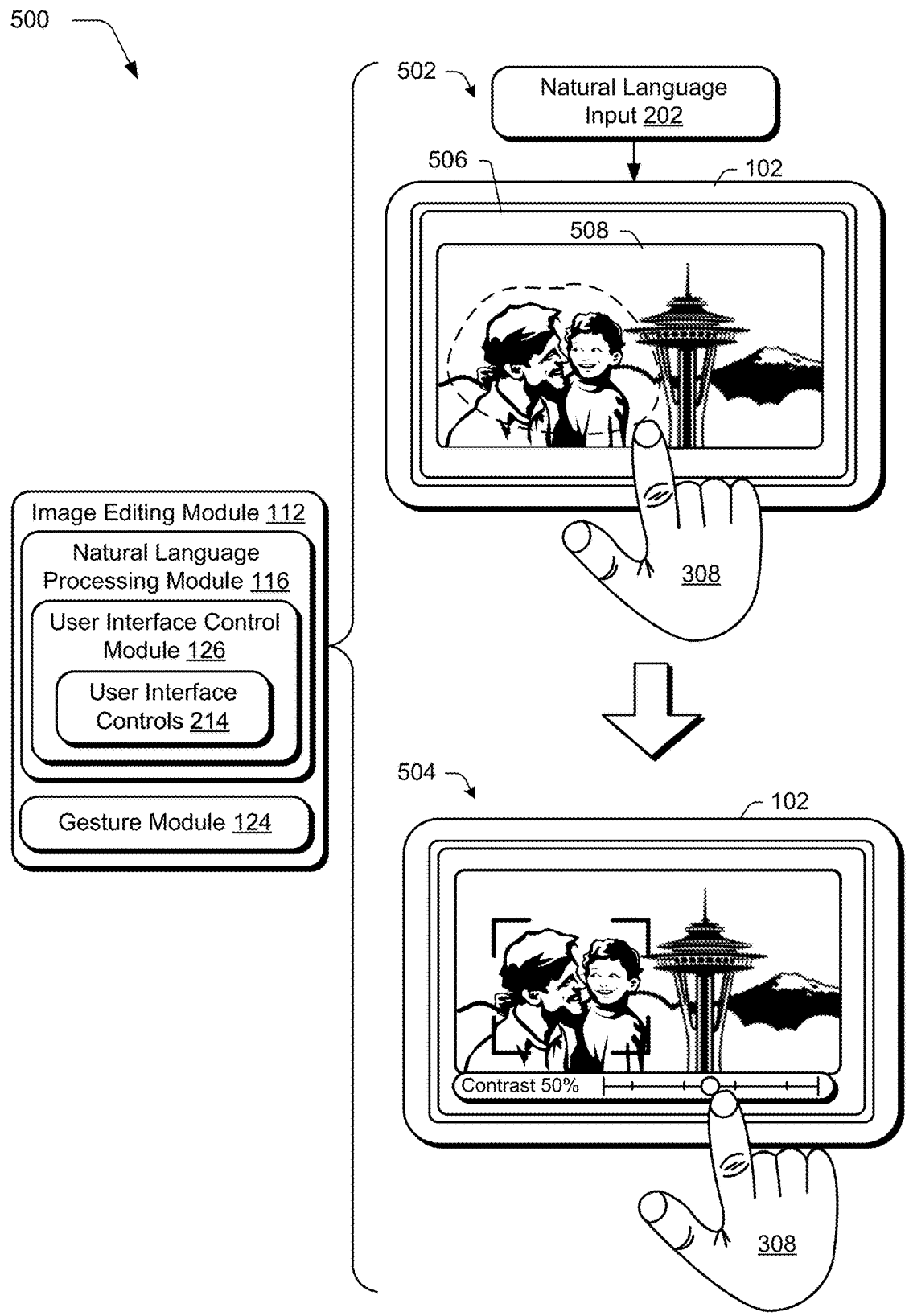
FIG. 5 depicts an example of a system showing output of a user interface control responsive to a natural language input and a gesture that is configured to specify a portion of an image to which an operation is to be performed.

FIG. 5 depicts an example of a system 500 showing output of a user interface control 214 responsive to a natural language input 202 and a gesture that is configured to specify a portion of an image to which an operation is to be performed. This system 500 is also illustrated as showing operation using first and second stage 502, 504.

Like the previous example, the computing device 102 is illustrated as assuming a hand-held configuration, such as a tablet computer although other examples are also contemplated. Through inclusion of the natural language processing module 116 and gesture module 124, operations of the image editing module 112 may be initiated in a variety of ways using a natural language input, such as via speech inputs, text, or a combination thereof. Further, a degree to which these operations may be performed may be adjusted using a user interface controls 214 of the user interface control module 126.

The computing device 102 is illustrated as including a display device 216 that supports touch functionality, such as through the use of one or more touch sensors that are configured to detect proximity of an object through configuration as capacitive, resistive, or image capture sensors. An image 508 is displayed by the display device 506 of image data 110 obtained by the image editing module 112 as described in FIG. 1. By leveraging use of the natural language processing module 116, interaction with the image editing module 112 may be supported without the limitations encountered using conventional approaches.

For example, in the illustration a gesture is illustrated in phantom as being input via a finger of a user's hand 308. The gesture 206 in this instance is used to specify a portion of the image 508 to which an image editing operation is to be applied. The gesture module 124 may identify the touch inputs as a gesture that specifies the portion.

Additionally, the natural language processing module 116 may receive a natural language input 202 that, once processed, identifies an operation to be performed, e.g., "improve contrast." The natural language input 202 may also specify a degree to which the operation is to be performed. User interface controls 214 that may be output as a result of the identified gesture and natural language input 202 are shown in the second stage 504.

In the second stage 504, a first user interface control is shown as a bounding box as before that may be used to adjust a size of a portion specified by the gesture. A second user interface control is illustrated as a slider control to adjust the degree of performance of the contrast operation to the portion identified in the bounding box. Thus, in this example the gesture defines a portion of the image 508 to which the operation specified in the natural language input 202 is to be performed to the degree specified in the natural language input 202. Other combinations of natural language inputs may also leverage functionality of the user interface controls, another example of which may be found in the following discussion and corresponding figure.

Figure 6:
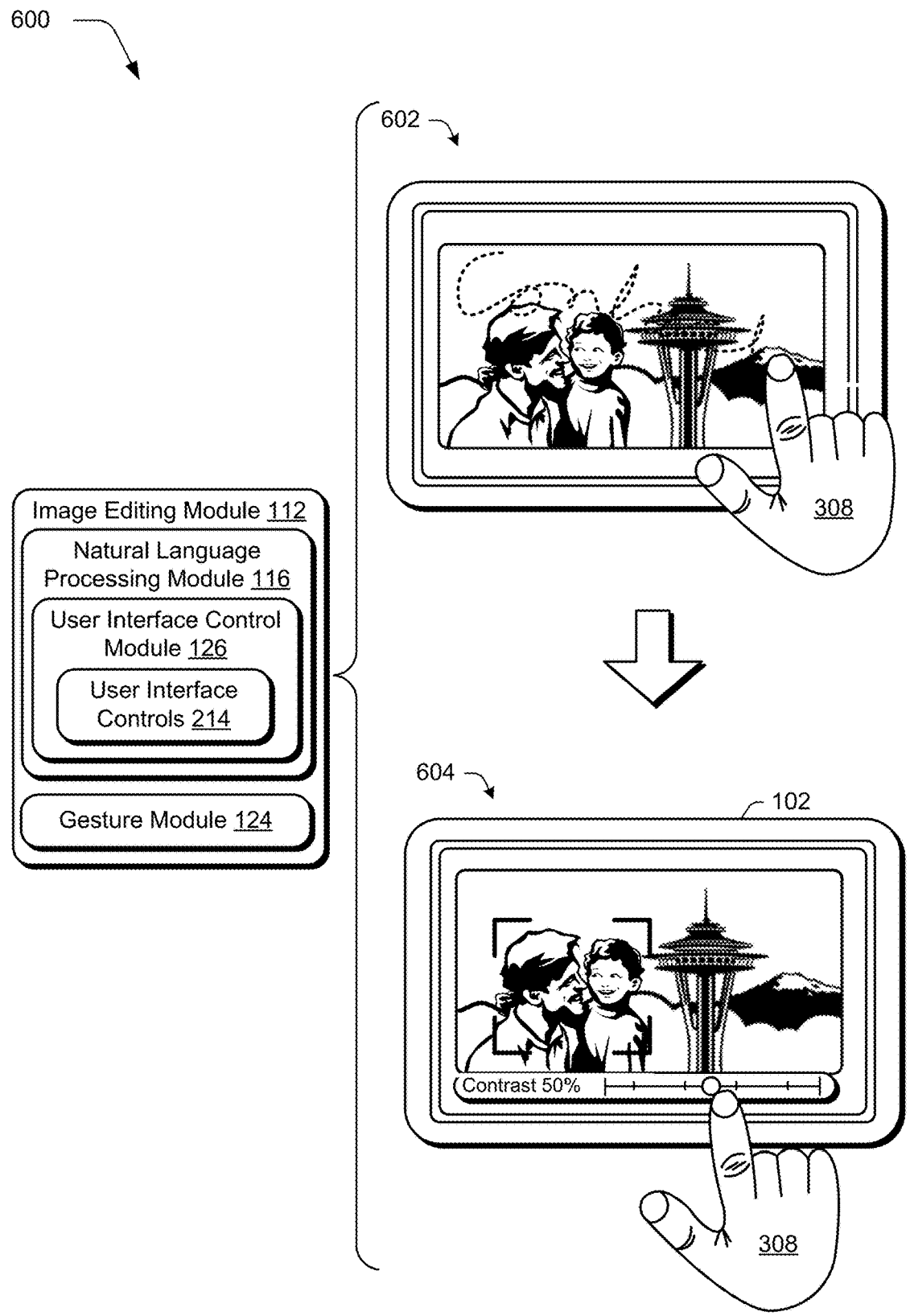
FIG. 6 depicts an example of a system showing output of a user interface control responsive to natural language inputs that are configured to specify a portion of an image to which an operation is to be performed.

FIG. 6 depicts an example of a system 600 showing output of a user interface control 214 responsive to natural language inputs that are configured to specify a portion of an image to which an operation is to be performed. This system 600 is also illustrated as showing operation using first and second stages 602, 604.

At the first stage 602, a natural language input is entered manually by a user. This is illustrated in phantom as drawing a word "contrast" which may be recognized using touch-screen functionality as previously described in relation to FIG. 5, such as by employing the gesture module 124. Thus, a gesture may be utilized to provide a natural language input that specifies an operation to be performed by providing at least a portion of the text of the natural language input.

This may be performed in conjunction with input of another natural language input, such as a speech input provided by a user and then processed to identify text "apply to the people in the image." Other examples are also contemplated as previously described in which a natural language input or other input is not provided to specify a portion or a degree to which to perform the operation.

Accordingly, the natural language processing module 116 in conjunction with the user interface control module 126 may locate user interface controls 214 that correspond to the operation. Illustrated examples of which are shown at the second stage 604 as a slider control and bounding box. As before, the bounding box may be utilized to specify a portion of the image on which an operation is to be performed and the slider control may be utilized to specify a degree to which the operation is to be performed. A variety of other examples of gestures and natural language inputs are also contemplated without departing from the spirit and scope thereof.

Example Procedures

The following discussion describes natural language techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the previous figures.

Figure 7:
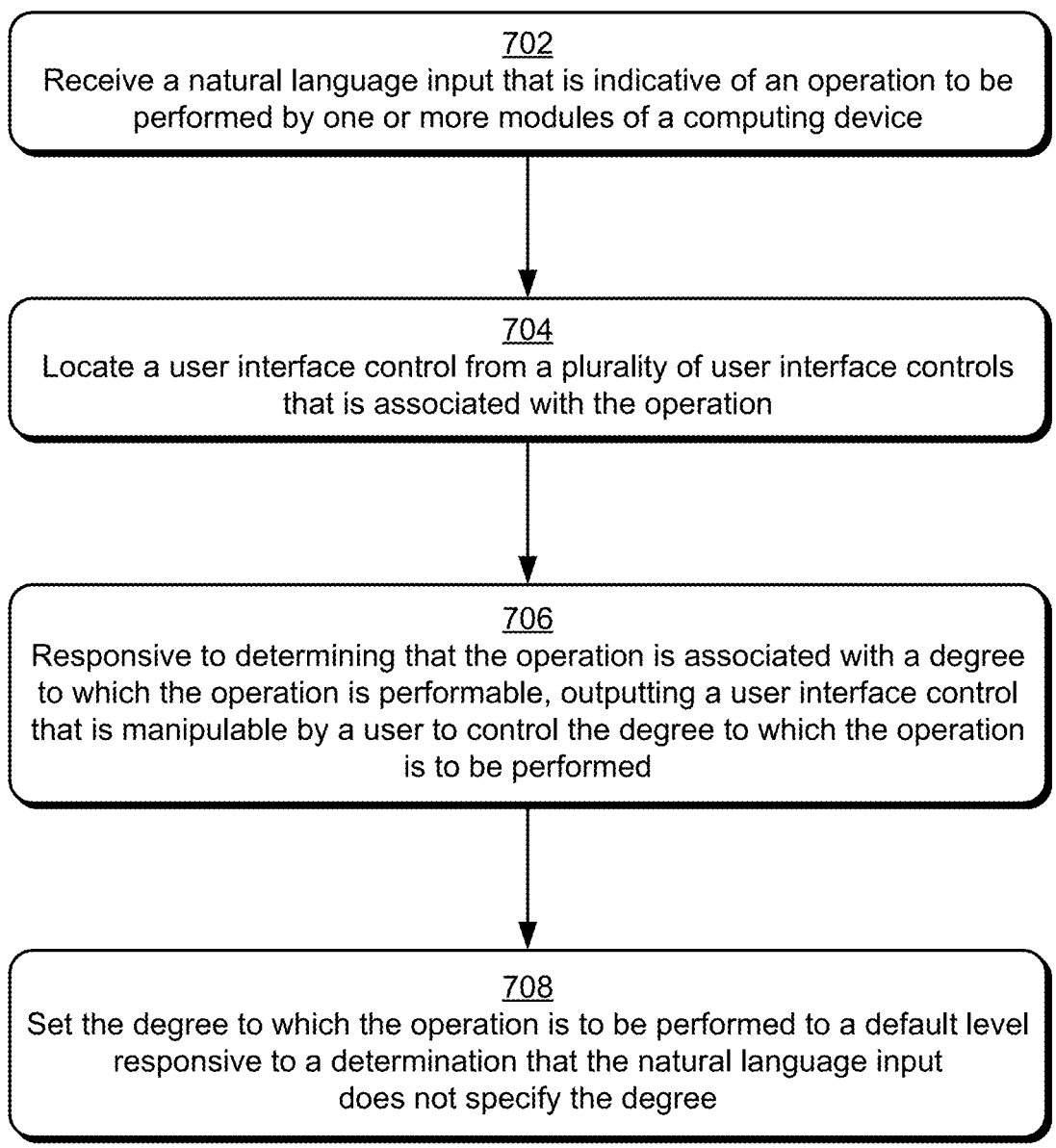
FIG. 7 depicts a procedure in an example implementation in which a user interface control is located to set a degree to which an operation is to be performed, the operation specified using a natural language input.

FIG. 7 depicts a procedure 700 in an example implementation in which a user interface control is located to set a degree to which an operation is to be performed, the operation specified using a natural language input. A natural language input is received that is indicative of an operation to be performed by one or more modules of a computing device (block 702). The natural language input may originate from a variety of different sources. A speech input, for instance, may be captured using an audio capture device and translated into text using a speech-to-text engine. In another example, the natural language input may be manually entered by a user, such as typed using a keyboard, drawn and recognized as a gesture, and so on. Text of the natural language input may then be processed to determine an operation to which the text is likely to correspond, such as to use lexicon ontologies and semantic distances.

A user interface control is located from a plurality of user interface controls that is associated with the operation (block 704). The user interface control module 126, for instance, may use identification of the operation to determine which of a plurality of controls correspond to the operation. This may include selection from a variety of configurations, such as configurations to set a particular one of a plurality of values, configurations to specify a portion that is to be operated on, and so forth.

Responsive to a determination that the operation is associated with a degree to which the operation is performable, a user interface control is output that is manipulable by a user to control the degree to which the operation is to be performed (block 706). The user interface control, for instance, may be configured to respond to a speech input, manual input specifying a numerical value for the degree, a gesture, adjustment of an indication of the user interface control, and so on to adjust the degree to which the operation is performed.

In one or more implementations, the degree to which the operation is to be performed is set to a default level responsive to a determination that that natural language input does not specify the degree (block 708). The natural language input module, for instance, may identify that the natural language input specifies an operation that is performable to a specified degree. However, the natural language input module may also determine that the natural language input does not specify the degree. Accordingly, the natural language input module may utilize a default value specified for the operation and cause the user interface control to be output such that the degree may be subsequently readjusted as described by the user. A variety of other examples are also contemplated without departing from the spirit and scope thereof, one example of which that involves interaction with the user interface control is described as follows in conjunction with a corresponding figure.

FIG. 8 depicts a procedure 800 in an example implementation in which interaction with a user interface control to set a degree to which an operation is to be performed is described. A user interface control is displayed that is indicative of a degree to which an image editing operation is performed on at least a portion an image, the display performed response to receive of a natural language input that specifies the image editing operation and performed simultaneously with the portion of the image to which the image editing operation is performed (block 802). The user interface control, for instance, may be displayed to convey a relative numerical value associated with the degree to which the operation is performed, such as through display of a slider with an indication of a current value, radial dial, and so on.

The degree to which the image editing operation is performed is adjusted responsive to one or more inputs that are received via interaction with the user interface control (block 804). A user, for instance, may move an indication of a current value (e.g., the slider) in a slider control, adjust a radial portion of a radial dial, provide a speech input (e.g., adjust contrast "more" or "less"), and so on.

A result of the adjustment on at least the portion of the image is displayed simultaneously with a display of the user interface control that is indicative of the adjusted degree (block 806). The user interface control, for instance, may be displayed concurrently with an image to which an operation is to be performed that is associated with the control. The result may be displayed in real time such that a user may readily view a result of the adjustment.

Output of the user interface control may cease after a threshold amount of time has passed during which interaction with the user interface control has not occurred (block 808). For example, the user interface control may be output but a user may not desire to change a degree to which an operation has been applied, may have already indicated a desired degree, and so on. In this way, display of the user interface control may "time out" and thus removed from cluttering a user interface viewed by the user.

Example System and Device

Figure 9:
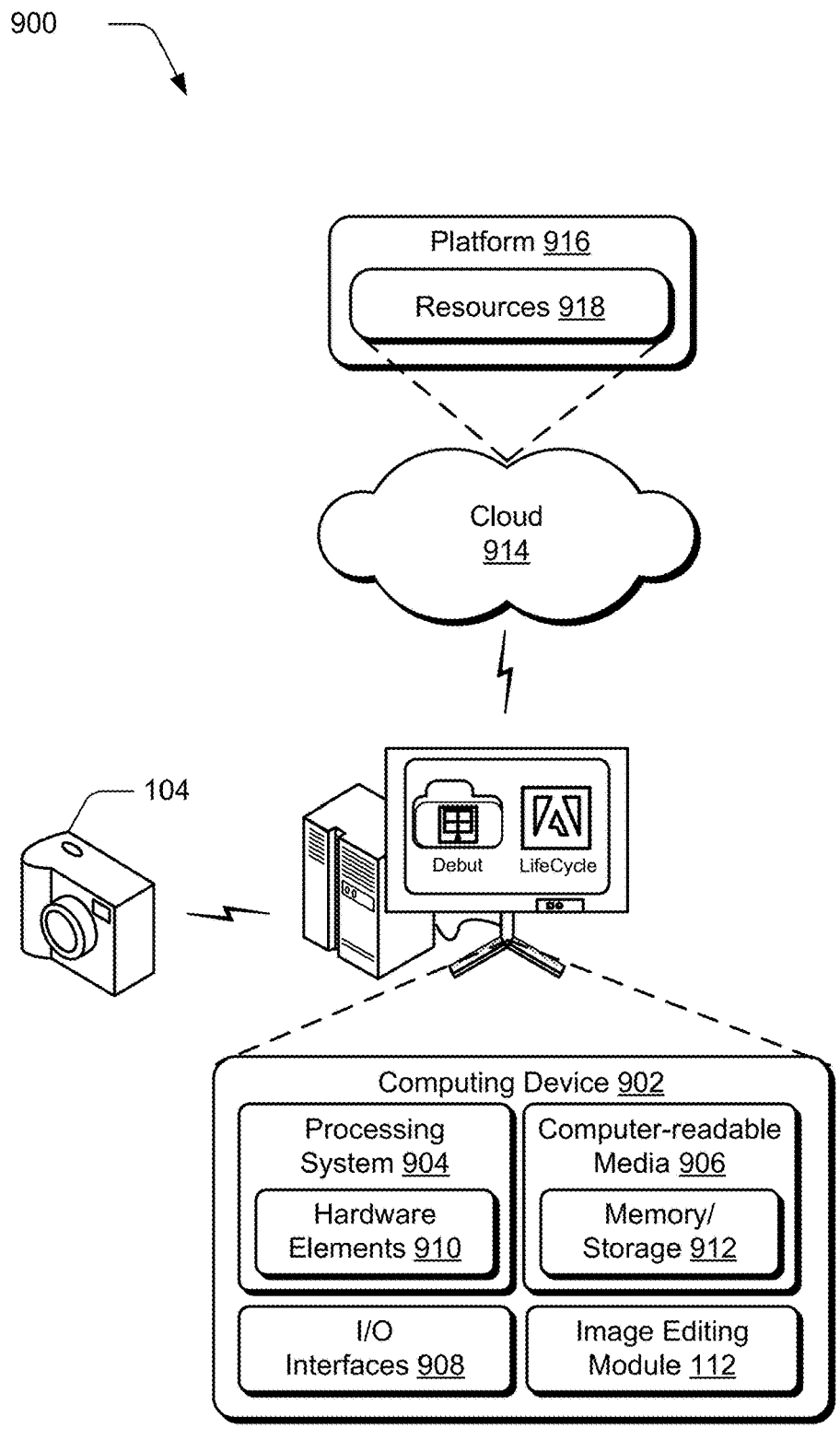
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the image editing module 112, which may be configured to process image data, such as image data captured by an image capture device 104. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources and functions to connect the computing device 902 with other computing devices. The platform 916 may also serve to abstract scaling of resources to provide a corresponding level of scale to encountered demand for the resources 918 that are implemented via the platform 916. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   displaying, by a display device, in a user interface, an image;
   capturing, by an audio capture device of a computing device, audio speech data describing a natural language input;
   converting, by a speech-to-text engine, the audio speech data into text;
   identifying, by a natural language processing module implemented by a processing system and computer-readable storage medium of the computing device, in the converted text of the audio speech data describing the natural language input:
      an object included in the image;
      an operation to be performed on the object in the image by one or more modules of the computing device; and
      a degree to which the operation is to be performed on the object in the image;
   recognizing, by an object identification module implemented by the processing system and computer-readable storage medium of the computing device implementing an object recognition algorithm, the object in the image indicated in the natural language input, wherein the object recognized by the computing device is a person, and the object recognition algorithm includes a facial recognition algorithm;
   drawing, by the object identification module implemented by the processing system and computer-readable storage medium of the computing device, a user manipulable boundary in the user interface around the recognized object;
   performing the identified operation to the identified degree on the recognized object, the operation being associated with a plurality of degrees;
   displaying a user interface control in the user interface including an indication of the identified degree to which the operation is performed, the user interface control manipulable by a user via the user interface to further adjust the degree to which the operation is performed, the displaying the user interface control occurring simultaneously with performing the identified operation to the identified degree on the recognized object;
   receiving, via the displayed user interface control, user input to adjust the identified degree to an adjusted degree;
   adjusting the identified degree to the adjusted degree; and
   adjusting the indication of the user interface control to indicate the adjusted degree.

2. A method as described in claim 1, wherein the user interface control includes a marker as the indication of the identified degree.

3. A method as described in claim 1, wherein the user interface control includes a plurality of additional indications corresponding to the plurality of the degrees to which the operation is performable, the plurality of additional indications displayed concurrently with the indication of the identified degree.

4. A method as described in claim 1, wherein the user interface control is configured as a slider control or a radial dial.

5. A method as described in claim 1, wherein the user interface control is manipulable by a user using a speech input.

6. A method as described in claim 1, further comprising ceasing the outputting of the user interface control after a threshold amount of time has passed during which interaction with the user interface control has not occurred.

7. A method as described in claim 1, further comprising locating the user interface control from a plurality of user interface controls that is associated with the operation.

8. A method as described in claim 1, further comprising receiving one or more inputs generated through interaction with the user interface control and adjusting the identified degree based on the one or more inputs.

9. A method as described in claim 1, further comprising setting the degree to which the operation is to be performed to a default level responsive to a determination that the natural language user input does not specify the degree.

10. One or more non-transitory computer-readable storage media comprising instructions stored thereon that, responsive to execution by a computing device, causes the computing device to perform operations comprising:
   capturing, by an audio capture device of the computing device, audio speech data describing a natural language input;
   converting, by a speech-to-text engine, the audio speech data into text;
   identifying, by a natural language processing module implemented by a processing system and computer-readable storage medium of the computing device, in the converted text of the audio speech data:
      an operation specified by the natural language input,
      a numerical degree to which to perform the operation, and
      an object in an image;
   recognizing, by an object identification module implemented by the processing system and computer-readable storage medium of the computing device implementing an object recognition algorithm, the object in the image, wherein the object recognized by the computing device is a person, and the object recognition algorithm includes a facial recognition algorithm;
   drawing, by the object identification module implemented by the processing system and computer-readable storage medium of the computing device, a user manipulable boundary in a user interface around the recognized object;
   performing the operation on the object to the identified numerical degree;
   finding, by a user interface control module, which of a plurality of user interface controls are associated with the operation;
   displaying by a display device, the found user interface control, the found user interface control displaying an indication of the identified degree to which the operation is performed;
   receiving, via the found user interface control, user input to adjust the identified degree to an adjusted degree;

adjusting the identified degree to the adjusted degree; and
adjusting the indication of the user interface control to indicate the adjusted degree.

11. One or more non-transitory computer-readable storage media as described in claim 10, wherein the found user interface control is a slider.

12. One or more non-transitory computer-readable storage media as described in claim 10, wherein the found user interface control is a radial dial.

13. One or more non-transitory computer-readable storage media as described in claim 10, wherein the found user interface control is displayed separate from a portion of the user interface on which the operation is to be performed.

14. A system comprising:
a display device to display an image in a user interface;
an audio capture device to capture audio speech data describing a natural language input;
at least a memory and a processor configured to:
  convert the audio speech data into text;
  identify, in the converted text of the audio speech data describing the natural language input, an object included in the image, an operation to be performed on the object in the image, and a degree to which the operation is to be performed on the object in the image;
  recognize the object in the image indicated in the natural language input, wherein the object recognized by the computing device is a person that is recognized using a facial recognition algorithm;
  draw a user manipulable boundary in the user interface around the recognized object;
  perform the identified operation to the identified degree on the recognized object, the operation being associated with a plurality of degrees;
  cause display of a user interface control in the user interface including an indication of the identified degree to which the operation is performed, the user interface control manipulable by a user via the user interface to further adjust the degree to which the operation is performed, the display of the user interface control occurring simultaneously with performing the identified operation to the identified degree on the recognized object;
  receive, via the displayed user interface control, user input to adjust the identified degree to an adjusted degree;
  adjust the identified degree to the adjusted degree; and
  adjust the indication of the user interface control to indicate the adjusted degree.

15. A system as described in claim 14, wherein the user interface control includes a marker as the indication of the identified degree.

16. A system as described in claim 14, wherein the user interface control includes a plurality of additional indications corresponding to the plurality of the degrees to which the operation is performable, the plurality of additional indications displayed concurrently with the indication of the identified degree.

17. A system as described in claim 14, wherein the user interface control is configured as a slider control or a radial dial.

18. A system as described in claim 14, wherein the user interface control is manipulable by a user using a speech input.

19. A system as described in claim 14, wherein the memory and the processor are further configured to cease displaying the user interface control after a threshold amount of time has passed during which interaction with the user interface control has not occurred.

20. A system as described in claim 14, wherein the memory and the processor are further configured to locate the user interface control from a plurality of user interface controls that is associated with the operation.

* * * * *